A. A. SAUTER.
AUTOMATIC FAN.
APPLICATION FILED AUG. 27, 1912.
1,089,271.
Patented Mar. 3, 1914.
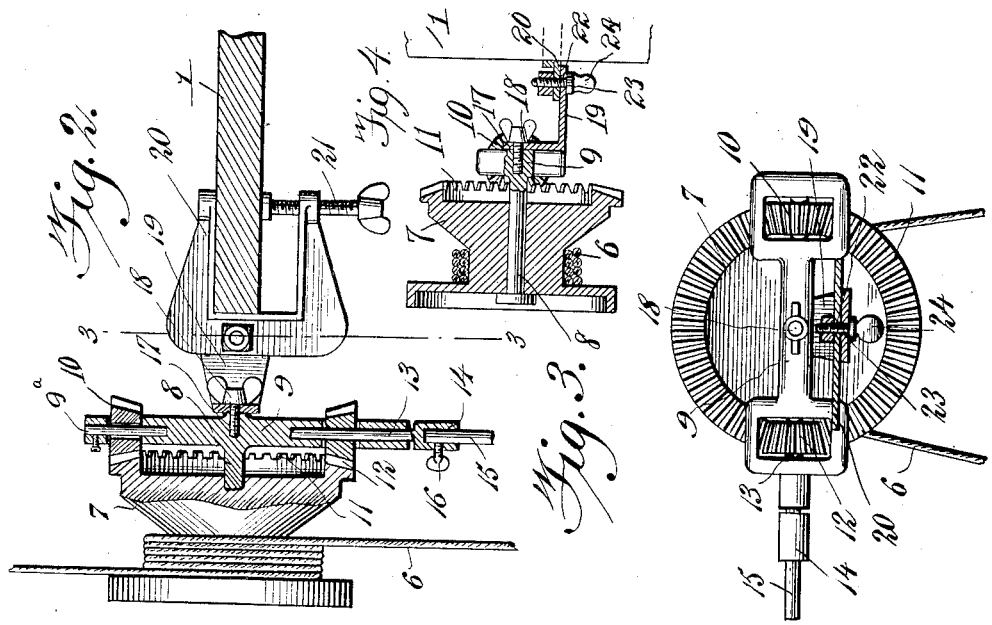
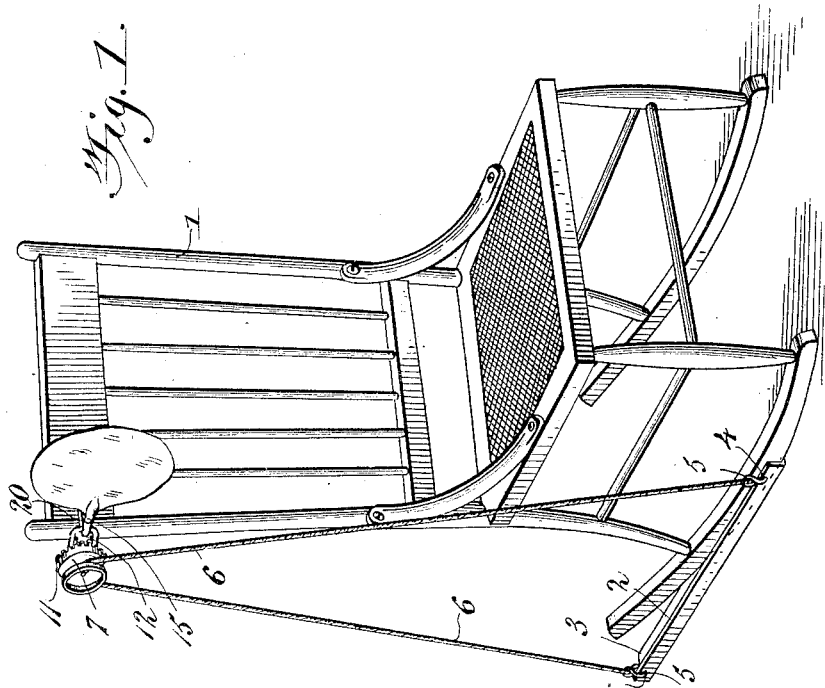
Witnesses
W. S. McDowell
Wm. J. Koerth
Inventor
August A. Sauter
By Victor J. Evans
Attorney

UNITED STATES PATENT OFFICE.

AUGUST A. SAUTER, OF COVINGTON, KENTUCKY.

AUTOMATIC FAN.

1,089,271.

Specification of Letters Patent. Patented Mar. 3, 1914.

Application filed August 27, 1912. Serial No. 717,349.

*To all whom it may concern:*

Be it known that I, AUGUST A. SAUTER, a citizen of the United States, residing at Covington, in the county of Kenton and State of Kentucky, have invented new and useful Improvements in Automatic Fans, of which the following is a specification.

The present invention relates to fan attachment for rocking or office chairs.

In carrying out my invention I propose to provide a fan attachment which may be easily and quickly secured upon any ordinary rocking or office chair, which may be readily adjusted to suit chairs of various sizes, and which may have the fan adjusted and retained at a suitable angle convenient to the occupant of the chair.

With the above and other objects in view, which will appear as the nature of the invention is more fully understood, the improvement resides in the construction, combination and operative arrangement of parts, set forth in the following description falling within the scope of the appended claim.

Figure 1 is a perspective view illustrating the improvement in applied position. Fig. 2 is a horizontal sectional view taken through the drum and brackets. Fig. 3 is a vertical sectional view upon the line 3—3 of Fig. 2. Fig. 4 is a detail vertical central sectional view of the same.

Referring now to the drawings in detail, the numeral 1 designates an ordinary rocking chair. Arranged beneath the rocker of the chair and adapted to contact therewith is a flat plate 2. This plate is preferably constructed of metal and has one of its longitudinal edges upset to provide a flange 3. The plate 2 is of a length slightly lesser than the length of the rocker, and the said plate being flat, is normally contacted only at its center by the rocker. The flange adjacent the opposite transverse ends of the plate is formed with openings 4 within which is arranged one of the ends of double hook members 5.

The hook members 5 are at the ends of a cable 6 and the central portion of the cable is wound on a drum 7. This drum is mounted on an axle 8 which is secured to the center of a member 9, the said member being provided with vertical openings near its ends. On the inner side of the drum is a beveled gear 11 which is engaged on one side by a beveled gear 12 and on the opposite side by a beveled gear 10. These gears are arranged in the openings of the member 9. A shaft 13 passes through the center of the gear 12 and is secured thereto and the said shaft has also its bearings in the member 9 and is provided at its outer end with a socket 14 in which is secured the stem of a fan 15 by means of a set screw 16. The gear 10 balances the gear 12 and is loosely mounted on a shaft 9ª which is secured in the member 9 as shown in Fig. 2. The member 9 is secured by a set screw 18 to the vertical arm of an L-shaped member 19 the said screw adapting the member 9 to be angularly adjusted and in a vertical plane on the said L-shaped member.

The numeral 20 designates a substantially U-shaped bracket, the same having one of its arms, preferably its lower arm, formed with a threaded bore, within which is received a threaded securing screw 21. This screw has its upper extremity provided with the usual swiveled head, while its lower extremity is formed with an enlargement which provides means for operating the said screw. The connecting member or arm of the substantially U-shaped bracket 20 is centrally formed with a rearwardly extending flange, the said flange having a threaded opening 22, which is adapted to register with a similar opening 23 provided in the free arm of the L-shaped member 19.

The numeral 24 designates a thumb screw, which passes through the opening 23 and coacts with the threaded opening 22 to retain the bracket and arm in an adjusted position, one with relation to the other.

From the above description, taken in connection with the accompanying drawing, it will be noted that the foot member or plate 2 may be readily detached from the remainder of the device when desired; that the cable 6 may be adjusted to arrange the device upon various sizes of chair; that the fan is removable so that any desired shape or size of fan may be employed, and that the bracket in connection with the L-shaped arm 19 provides means whereby the fan may be effectively sustained upon the chair and retained in any adjusted position or angle in relation to the chair to suit the convenience of the occupant of the chair.

It is to be understood that suitable casing may be employed for inclosing the gears, the same being of any desired construction, but as the casing does not enter the subject matter of the present application, it has not been deemed necessary to illustrate the same.

Having thus fully described the invention what is claimed as new is:

The herein described fan attachment for rocking chairs comprising, in combination with a plate for arrangement on the floor and engagement by one of the chair rockers, a bracket for attachment to the chair back, an L-shaped member having its horizontal arm secured to the bracket, a body member secured to the vertical arm of said L-shaped member and provided with an axle, a drum mounted for rotation on said axle and having a beveled gear, a shaft having bearings in said body member and also having means for the attachment of a fan thereto, a beveled gear fixed on said shaft and engaging the drum gear and a beveled gear to balance the said shaft gear, mounted in the said body member and engaging the drum gear at a point opposite the shaft gear, and a cable having its central portion coiled on the drum and its ends attached to the said plate.

In testimony whereof I affix my signature in presence of two witnesses.

AUGUST A. SAUTER.

Witnesses:
MARY LIGHT OGLE,
IDA M. ORREN.

Copies of this patent may be obtained for five cents each, by addressing the "Commissioner of Patents, Washington, D. C."